(12) United States Patent
Wolke et al.

(10) Patent No.: US 10,659,753 B2
(45) Date of Patent: May 19, 2020

(54) PHOTOGRAMMETRY SYSTEM AND METHOD OF OPERATION

(71) Applicant: FARO Technologies, Inc., Lake Mary, FL (US)

(72) Inventors: Matthias Wolke, Korntal-Münchingen (DE); Rolf Heidemann, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/596,047

(22) Filed: Oct. 8, 2019

(65) Prior Publication Data

US 2020/0036953 A1 Jan. 30, 2020

Related U.S. Application Data

(63) Continuation of application No. 15/985,936, filed on May 22, 2018, now Pat. No. 10,477,180.

(51) Int. Cl.
| | |
|---|---|
| *H04N 13/122* | (2018.01) |
| *G01S 3/786* | (2006.01) |
| *H04N 13/275* | (2018.01) |
| *G01S 17/48* | (2006.01) |
| *G01B 11/00* | (2006.01) |
| *G06T 1/00* | (2006.01) |

(52) U.S. Cl.
CPC ......... *H04N 13/122* (2018.05); *G01B 11/005* (2013.01); *G01S 3/786* (2013.01); *G01S 17/48* (2013.01); *G06T 1/0007* (2013.01); *H04N 13/275* (2018.05)

(58) Field of Classification Search
CPC .................................................. G01C 11/025
See application file for complete search history.

(56) References Cited

U.S. PATENT DOCUMENTS

| | | |
|---|---|---|
| 8,817,018 B1 | 8/2014 | Fan et al. |
| 9,661,295 B2 | 5/2017 | Bridges |

(Continued)

OTHER PUBLICATIONS

Feature detection (computer vision)—Wikipedia (pp. 1-5) Retrieved from Internet on May 16, 2018—https://en.wikipedia.org/wiki/Feature_detection_(computer_vision).

(Continued)

*Primary Examiner* — Jitesh Patel
(74) *Attorney, Agent, or Firm* — Cantor Colburn LLP

(57) ABSTRACT

A photogrammetry system and method is provided. The photogrammetry system a two-dimensional (2D) camera operable to acquire a 2D image at a first resolution and a second resolution, and a 2D video image at the second resolution. A controller performs a method that includes acquiring a first 2D image of an object with the 2D camera at the first resolution. At least one feature on the object in the first 2D image. An image sequence is determined having a second position. A plurality of second 2D images are acquired with the 2D camera at the second resolution. The 2D camera is tracked. A direction of movement is indicated on the display. A third 2D image of the object is acquired when the 2D camera reaches the second position. Three-dimensional coordinates of the object are determined based on the first 2D image and the third 2D image.

19 Claims, 7 Drawing Sheets

(56) References Cited

U.S. PATENT DOCUMENTS

| | | | |
|---|---|---|---|
| 2005/0271264 A1* | 12/2005 | Ito | G06T 5/006 382/154 |
| 2008/0007722 A1 | 1/2008 | Bazant et al. | |
| 2008/0146302 A1* | 6/2008 | Olsen | A63F 13/213 463/7 |
| 2011/0153198 A1* | 6/2011 | Kokkas | G01C 21/3638 701/533 |
| 2012/0039547 A1* | 2/2012 | Gerhard | G06T 3/4092 382/305 |
| 2013/0076862 A1* | 3/2013 | Ohtomo | G01C 11/025 348/46 |
| 2013/0100282 A1* | 4/2013 | Siercks | G01B 11/2513 348/135 |
| 2014/0168370 A1* | 6/2014 | Heidemann | G01B 11/2513 348/46 |
| 2015/0292876 A1 | 10/2015 | Pettersson et al. | |
| 2016/0073104 A1* | 3/2016 | Hillebrand | H04N 17/002 348/47 |
| 2016/0093099 A1 | 3/2016 | Bridges | |
| 2017/0026576 A1* | 1/2017 | Shishido | H04N 5/23238 |
| 2017/0054965 A1* | 2/2017 | Raab | G01C 11/02 |
| 2017/0094251 A1 | 3/2017 | Wolke et al. | |
| 2018/0112978 A1* | 4/2018 | Burton | G06T 7/579 |
| 2019/0178643 A1 | 6/2019 | Metzler et al. | |

OTHER PUBLICATIONS

Human Alloy (pp. 1-5) Retrieved from Internet on May 16, 2018—https://humanalloy.com/.

MobileFusion: Create 3D scans with your mobile phone—YouTube—Published on Aug. 24, 2015, Retrieved from Internet: https://youtu.be/8M_-ISYqACo.

Scale-invariant feature transform—Wikipedia (pp. 1-18) Retrieved from Internet on May 16, 2018—https://en.wikipedia.org/wiki/Scale-invariant_feature_transform.

The poor man's guide to photogrammetry (pp. 1-27) Retrieved from Internet on May 16, 2018—https://bertrand-benoit.com/blog/the-poor-mans-guide-to-photogrammetry/.

Windows 10 Creators Update takes 3D to the next level (CNET News)—YouTube—Published on Oct. 26, 2016, Retrieved from Internet: https://www.youtube.com/watch?v=XDJQTYQG0gU.

* cited by examiner

PHOTOGRAMMETRY SYSTEM AND METHOD OF OPERATION

CROSS-REFERENCE TO RELATED APPLICATIONS

The present application is a continuation of U.S. application Ser. No. 15/985,936 filed on May 22, 2018, the contents of which is incorporated by reference herein.

BACKGROUND

The subject matter disclosed herein relates to a photogrammetry system, and in particular to a photogrammetry system that includes a user guidance arrangement for the acquisition of three-dimensional coordinates.

Photogrammetry is a method of making measurements from two-dimensional (2D) images or photographs. When two or more images are acquired at different positions that have an overlapping field of view, common points or features may be identified on each image. By projecting a ray from the camera location to the feature/point on the object, the three-dimensional (3D) coordinate of the feature/point may be determined using trigonometry.

In order for photogrammetry to be used, the images acquired of the object need to overlap so that common features can be identified. It has been found that the accuracy of the 3D coordinates may be increased when a common feature/point is located in three images acquired at different camera positions or poses. One common issue is that users don't acquire enough images of the object and there may be insufficient data to determine three-dimensional coordinates of at least portions of the object. Another common issue is that a user may acquire too many images resulting in reduced processing speed.

Accordingly, while existing photogrammetry systems for measuring three-dimensional coordinates are suitable for their intended purposes the need for improvement remains, particularly in providing a photogrammetry system that guides a user during the acquisition of images.

BRIEF DESCRIPTION

According to one aspect of the disclosure, a photogrammetry system is provided. The system includes a two-dimensional (2D) camera operable to acquire a 2D image at a first resolution and a second resolution, the first resolution being higher than the second resolution, the 2D camera further being operable to acquire a 2D video image at the second resolution. A user interface having a display. A controller having a processor is provided that is responsive to nontransitory executable computer instructions to perform a method comprising: acquiring a first 2D image of an object with the 2D camera at the first resolution; detecting at least one feature on the object in the first 2D image; determining an image sequence, the image sequence including a second position; acquiring with a plurality of second 2D images with the 2D camera at the second resolution; tracking, as the 2D camera is moved, the position and pose of the 2D camera based at least in part on the plurality of second 2D images; indicating on the display a direction of movement from the first position to the second position; acquiring a third 2D image of the object when the 2D camera reaches the second position; and determining three-dimensional (3D) coordinates of one or more points on the object based at least in part on the first 2D image and the third 2D image.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a system and method of acquiring three-dimensional coordinates using photogrammetry. Further embodiments of the present disclosure provide for a system and method of acquiring images for photogrammetry where the user is guided to positions or poses for acquiring images. Further embodiments of the present disclosure provide for a system and method of determining a sequence of images, including position and pose for each image, based on one or more overview images.

Photogrammetry is a technique for measuring objects using images, such as photographic images acquired by a digital camera for example. Photogrammetry may be based on markers (e.g. lights or reflective stickers) or based on natural features. By acquiring multiple images of an object, or a portion of the object, from different positions or poses, 3D coordinates of points on the object may be determined based on common features or points and information on the position and pose of the camera when each image was acquired. In order to obtain the desired information for determining 3D coordinates, the features are identified in two or more images. Since the images are acquired from different positions or poses, the common features are located in overlapping areas of the field of view of the images. In an embodiment, the images have an 80% overlap with at least one other acquired image.

Figure 1:
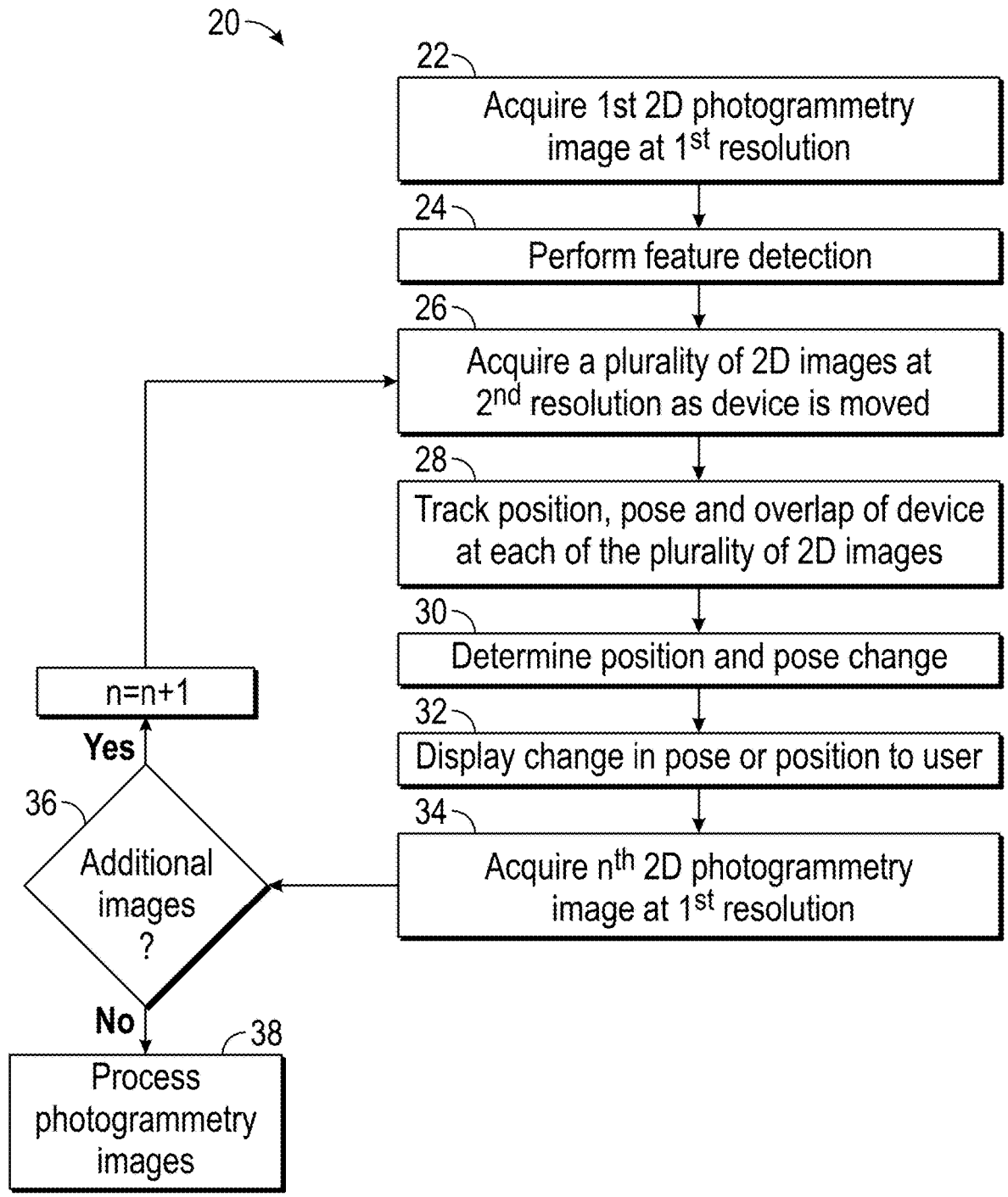
FIG. 1 is a flow diagram of a method of measuring an object using photogrammetry according to an embodiment.

Referring now to FIG. 1, a method 20 of acquiring images for the measurement of 3D coordinates by photogrammetry is shown. The method 20 uses an image acquisition device, such as a camera or a mobile device having a camera (e.g. a cellular phone or a tablet computer for example). In some embodiments, the image acquisition device may be a photogrammetry device having a medium resolution camera, such as a model MC124CG-SY (12.4 megapixel) manufactured by XIMEA Corp or model axA4024-29uc (12 megapixel) manufactured by Basler AG. In some embodiments, the image acquisition device may be a photogrammetry device having a high resolution camera, such as model CB500CG-CM (47.5 megapixel) manufactured by XIMEA Corp. The image acquisition device may include a user interface that allows the operator to view the image that may be acquired by the camera. In some embodiments, the user interface includes visual indicators that show the operator which direction to move the image acquisition device or how to change the pose (pan, tilt, roll).

In the illustrated embodiment, the camera of the image acquisition device can acquire images at a first resolution and a second resolution, where the first resolution is higher than the second resolution. In an embodiment, the second resolution is one-half or one-quarter of the first resolution. The image acquisition device is further configured to acquire video images at a predetermined frame rate (e.g. 30 fps or 60 fps).

The image acquisition device further includes a controller having at least one processor and memory. The controller is configured to execute nontransitory executable instructions for carrying out control methods, such as the method 20 for example.

The method 20 starts in block 22 where a first 2D photogrammetry image is acquired at a first resolution. The method 20 then proceeds to block 24 where a feature detection process is performed. The feature detection may be any known feature detector, such as by not limited to SIFT, SURF and BRIEF methods. Regardless of the feature detection process used, one or more features (edges, corners, interest points, blobs or ridges) are identified in the first 2D photogrammetry image. The method 20 then proceeds to block 26 where a plurality of 2D images are acquired at the second resolution as the image acquisition device is moved from an initial position to a first position. In an embodiment, the plurality of 2D images are acquired as a video.

In block 28, for each of the plurality of 2D images (e.g. each frame of the video), the position and pose of the image acquisition device is determined based on matching features in each of the plurality of 2D images with the first 2D photogrammetry image. In an embodiment, the matching of features are identified using the FLANN feature matching algorithm. The result of the feature matching results in an estimation of the relative pose and position of the image acquisition device between the first 2D photogrammetry image and the current image, a rough estimate of the path the camera has taken between the first 2D photogrammetry image and the current image and the amount of overlap between the first 2D photogrammetry image and the current image. In an embodiment, the amount of overlap for an image acquired by the image acquisition device at the current location and pose is estimated by comparing a current frame of the plurality of 2D images with the first 2D photogrammetry image.

The method 20 then proceeds to block 30 where it is determined from the overlap and the path information how to change the current camera position in order to increase, or decrease, the amount of overlap between the first 2D photogrammetry image and the current image (i.e. the current frame). Via the user interface, the indicators display a visual indication to the user in block 32 on how to move (translation) or rotate (pan, tilt, roll) the image acquisition device to have the desired amount of overlap. In an embodiment, the desired amount of overlap is about 80%. In an embodiment, the desired amount of overlap is user-defined.

When the user have moved the image acquisition device to a position or pose that allows for the acquisition of an image with the desired amount of overlap, the method proceeds to block 34 wherein a second 2D photogrammetry image is acquired at the first resolution. It should be appreciated that the first 2D photogrammetry image and second 2D photogrammetry image may be stored to memory. In an embodiment, the plurality of 2D images acquired at the second resolution are not stored in memory, or may be deleted once the second 2D photogrammetry image is acquired.

The method 20 then proceeds to query block 36 where it is determined whether additional images are desired to obtain the desired measurements of the object. When the query block 36 returns a positive (additional images desired), the method loops back to block 26 and the process of tracking, determining the position and pose change and movement of the image acquisition device is repeated until the desired number of 2D photogrammetry images are acquired. In an embodiment, where multiple 2D photogrammetry images are acquired (e.g. the query block 36 returns a positive one or more times), the method 20 may determine the position and pose change (in block 30) by comparing the current frame of the plurality of 2D images with each of the 2D photogrammetry images and determining an amount of overlap with each of the 2D photogrammetry images. In still another embodiment, the method 20 compares the current frame with the last 2D photogrammetry image that was acquired. When the query block 36 returns a negative, the method 20 proceeds to block 38 where the acquired 2D photogrammetry images are processed to determine 3D coordinates of points on the object as is known in the art.

In some embodiments, the processing of the 2D panoramic images is performed as soon as two 2D photogrammetric 2D images are acquired. This pair of 2D panoramic images may then be accurately matched and the result may be used as a feedback to the image alignment to improve or make more accurate the position and pose of subsequent 2D panoramic images. It should be appreciated that this provides advantages in reducing processing time and also allows for the displaying of a sparse point cloud on the user interface.

Figure 2:
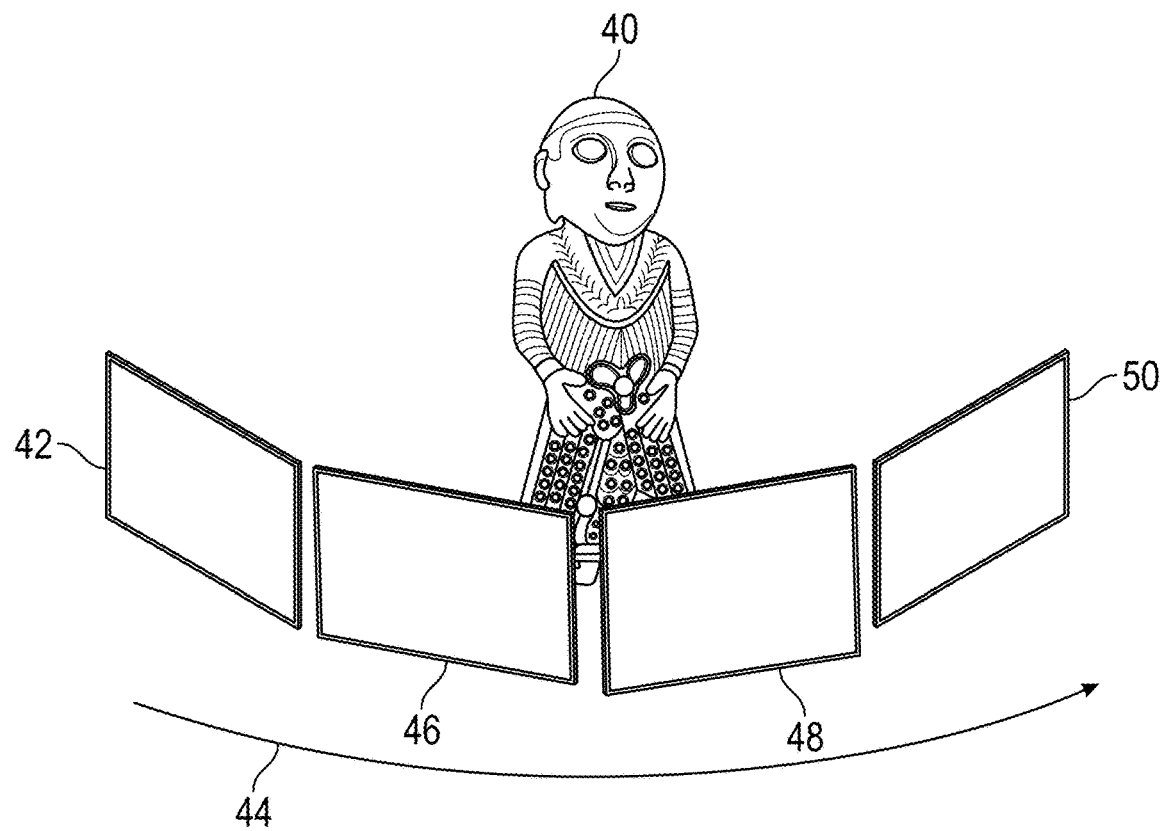
FIG. 2-FIG. 5 are schematic illustration of the method of measuring an object of FIG. 1 in accordance with one or more embodiments.

Referring now to FIGS. 2-5, with continuing reference to FIG. 1, embodiments describing how the method 20 is performed and the positions and pose of the image acquisition device are illustrated. Referring first to FIG. 2, it is desired to obtain 3D coordinates of points on an object 40. For relatively simple objects 40 a next neighbor matching can be used to perform the measurements. In this embodiment, a first 2D panoramic image 42 is acquired at a first position and pose (block 22). After performing the feature identification (block 24), the user interface displays an indicator that indicates to the operator that they should move the image acquisition device in the direction of arrow 44. The position and pose of the image acquisition device is tracked using a plurality of 2D images at the second resolution (e.g. video frames) until the image acquisition device in in the position and pose of a second 2D panoramic image 46. The process continues until 2D panoramic images 48, 50 are acquired. It should be appreciated that in this embodiment, a significant part of the object fits in the field of view (FOV) of the image acquisition device and there are also common points/features in 2D panoramic images.

It should be appreciated that while the illustrated embodiments show the 2D panoramic images as only being acquired on one side of the object 40, this is for exemplary purposes and the claims should not be so limited. In other embodiments, the operator would continue in the direction of arrow 40 acquiring images around the entire object 40 (360°). In these embodiments, the plurality of 2D panoramic images forms a closed loop, with the last 2D panoramic image overlapping with the first 2D panoramic image. Once all of the 2D panoramic images are acquired, they may be processed using photogrammetry techniques to determine 3D coordinates of points on the object 40.

Figure 3:
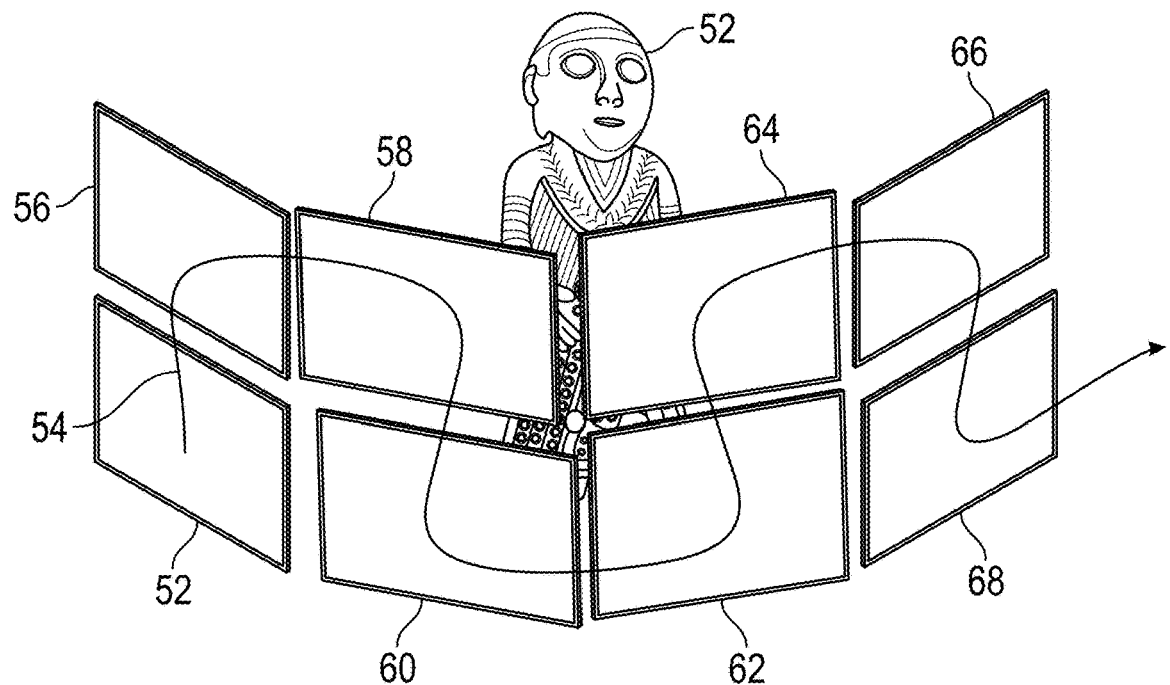

Referring now to FIG. 3, an embodiment is shown for measuring a larger object 52 using the method 20. In this embodiment, the first 2D panoramic image 54 is acquired at a first position and pose. Features are identified on the object 52 and the user interface indicates to the operator to follow a path 54 to a second position where a second 2D panoramic image 56 is acquired. In the embodiment of FIG. 3, the path 54 is chosen to account for overlap between directly adjacent (neighbor) frames. The operator is directed (via the user interface) to move the image acquisition device along the serpentine path 54 in the desired pose until all of the 2D panoramic images 58, 60, 62, 64, 66, 68 are acquired. Once all of the 2D panoramic images are acquired, they may be processed using photogrammetry techniques to determine 3D coordinates of points on the object 52.

Figure 4:
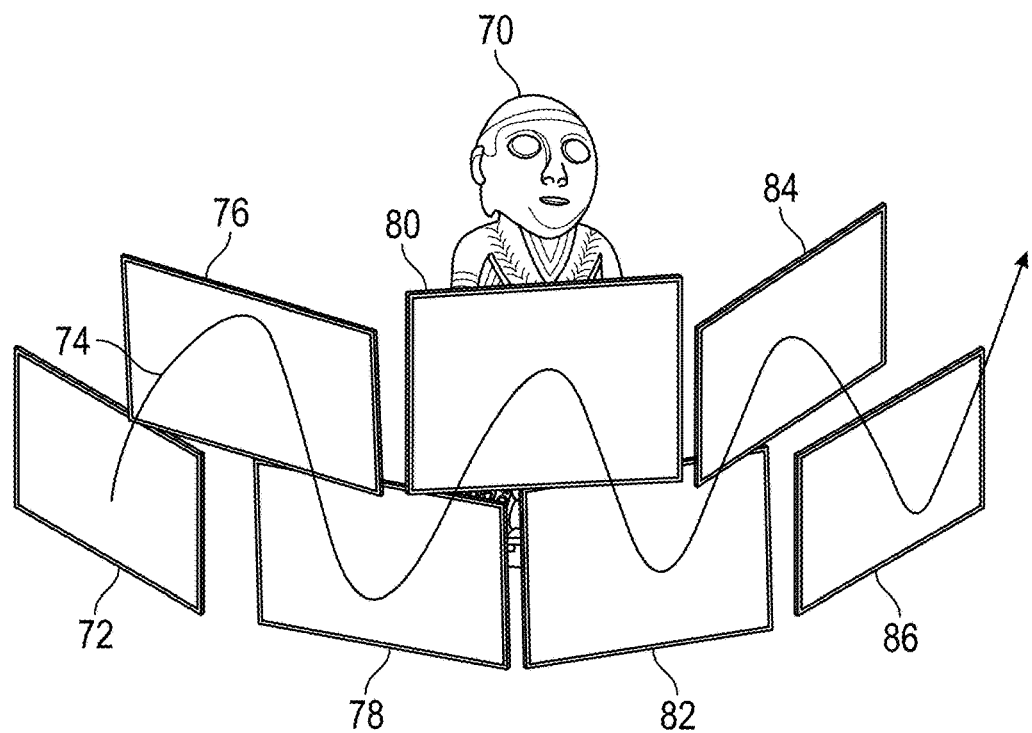

It should be appreciated that while the embodiment of FIG. 3 reduces the number of images acquired and also decreases the risk of the operator not having enough overlap or missing areas of the object, other paths may be indicated to the operator. Referring now to FIG. 4, an object 70 is to be measured using the method 20. In this embodiment, rather than simply acquiring a series of sequential, side-by-side, 2D panoramic images, the pose of the image acquisition device is changed to allow for a reduced number of images to be acquired while still providing a desired amount of overlap. In this embodiment, a first 2D panoramic image 72 is acquired a first position and pose. The operator is then directed (via indicators on the user interface) to move along a path 74. It should be appreciated that the path 74 differs from the path 54 (FIG. 3) in that the path 54 has a shape that is similar to a square waveform. In other words, adjacent images in FIG. 3 are either approximately vertically or horizontally next to each other. The path 74 of FIG. 4, by contrast has a shape that is closer to a triangular or sinusoidal waveform. In this way, the second 2D panoramic image 76 is offset from the adjacent 2D panoramic images 72, 78. In an embodiment, the pose of the 2D panoramic images 72, 76, 78 are determined to provide the desired amount of overlap.

The operator continues to move the image acquisition device along the path 74 until all of the 2D panoramic images 80, 82, 84, 86 are acquired. Once all of the 2D panoramic images are acquired, they may be processed using photogrammetry techniques to determine 3D coordinates of points on the object 70. It should be appreciated that embodiments that utilize the path 74, fewer images are acquired and will be processed during the photogrammetry step, reducing the computational requirements of the 3D measurements.

Figure 5:
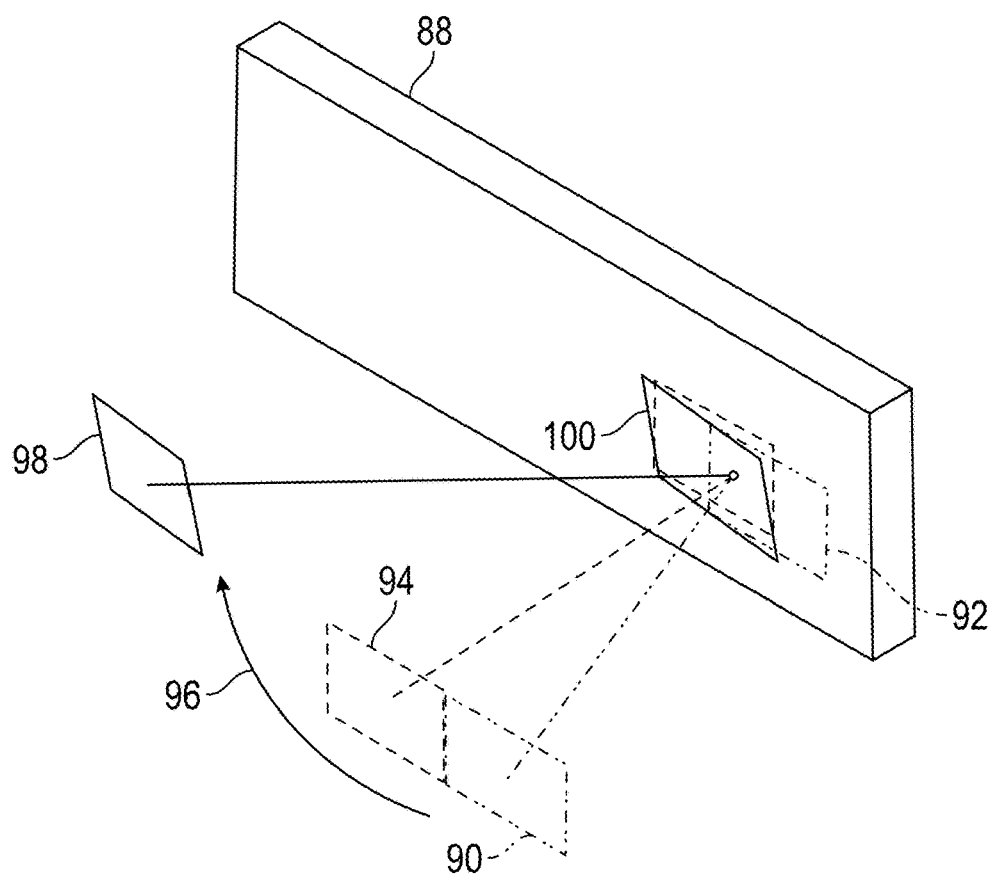

Referring now to FIG. 5, an embodiment is shown of an object 88 that is much larger than the field of view of the image acquisition device, such as the wall 88. In these types of embodiments, it may be desirable to acquire the 2D panoramic images from a different standpoint and pose than could be provided by simply acquiring 2D panoramic images adjacent to each other. For example, a first 2D panoramic image 90 is acquired of a portion 92 of the wall 88 that includes the feature 88. Rather than acquiring an adjacent (neighbor) 2D panoramic image 94, the user is directed to follow a path 96 until at the position of 2D panoramic image 98, which acquires an image of a portion 100 on the wall 88. Due to the angle of the image 98, the field of view represented by portion 100 has a more clearly parallelogram shape caused by the larger angle of the pose of the image acquisition device when the image 98 is acquired. It has been found that these larger angles lead to higher accuracy.

Figure 6:
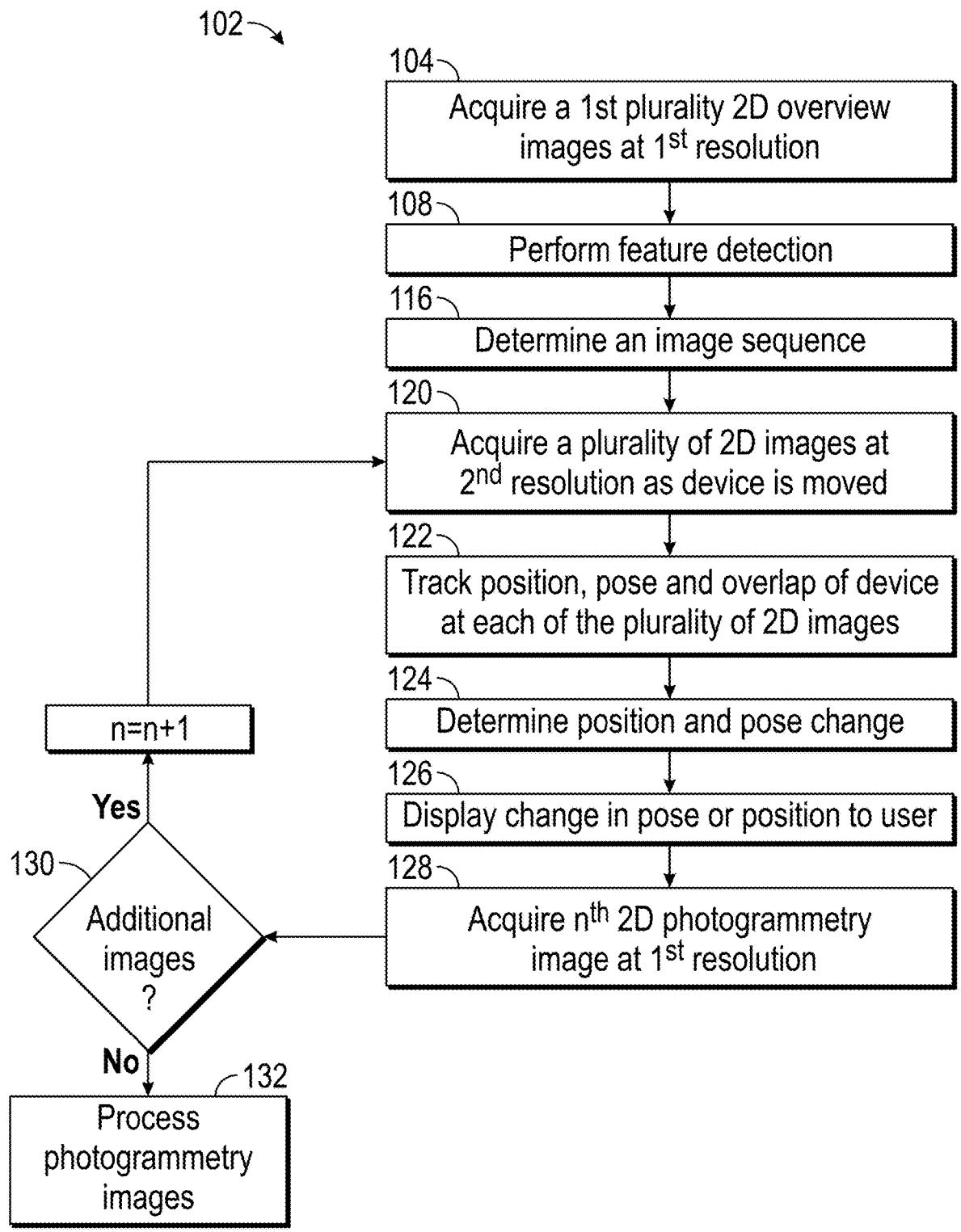
FIG. 6 is a flow diagram of a method of measuring an object using photogrammetry according to an embodiment.
Figure 7:
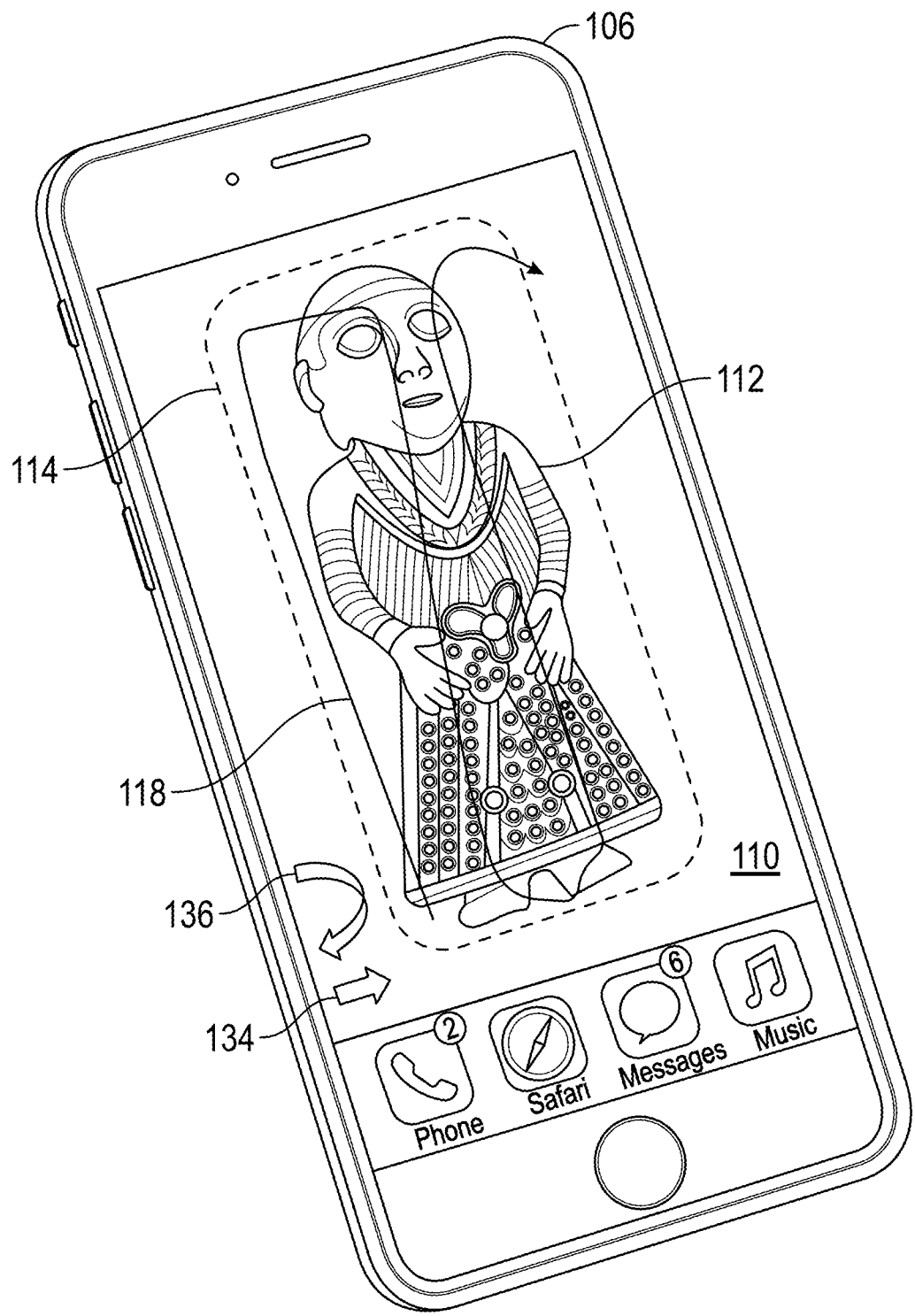
FIG. 7 is a schematic illustration of a mobile image acquisition device displaying a trajectory for acquiring photogrammetry images of an object according to an embodiment.

Referring now to FIG. 6 and FIG. 7, another embodiment of a method 102 is shown for acquiring images and determining 3D coordinates of an object using photogrammetry. The method 102 begins in block 104 where a first plurality of 2D overview images are acquired at a first resolution with the image acquisition device 106 (FIG. 7). It should be appreciated that in some embodiments, only a single over image may be needed. This first plurality of overview images are processed to perform feature detection in block 108. In an embodiment, the overview images 112 are displayed on the user interface 110. It should be appreciated that the operator may only want to measure a portion of the object, or may wish to exclude objects that are in the environment. In this embodiment, the operator may indicate where measurements are desired via the user interface 110, such as by drawing an outline 114 around the areas to be measured.

The method 102 then proceeds to block 116 where an image sequence and a path 118 is determined for the area within the outline 114. In an embodiment, the path 118 is displayed on the user interface 110 guide the operator. The position and pose of the image acquisition device 106 is tracked in block 120 by acquiring a plurality of 2D images at the second resolution (e.g. video frames) and by performing feature matching between each image of the plurality of 2D images and the features of the overview image in block 122. In an embodiment, the method 102 determines a position or pose change in block 124 from current position to a desired position. The desired direction or pose change is then indicated on the user interface 110 in block 126. In an embodiment, the operator is directed via the user interface 110 to a first position and pose to acquire a first 2D panoramic image at the start of the path 118 in block 126.

Once the image acquisition device 106 is in the first position and pose, the first 2D panoramic image is acquired in block 128. The method 102 then proceeds to query block 130 where it is determined if additional images are desired. When the query block 130 returns a positive, the method 102 loops back to block 120 and the method 102 continues until the sequence of images determined in block 116 have been acquired. When the query block 130 returns a negative, the method 102 proceeds to block 132 and the 2D panoramic images are processed to determine the 3D coordinates of points on the object using photogrammetry. As discussed herein, in some embodiments, the photogrammetry process is initiated once two 2D panoramic images are acquired. In this embodiment, the path 118 may be changed using the results of the photogrammetry process.

Embodiments herein describe the use of indicators to guide the operator to the position and pose where the 2D panoramic image may be acquired. In an embodiment, the indicators may include straight arrows 134 that show the translational direction of movement and curved arrows 136. In other embodiments where the path 118 is displayed on the user interface 110, the indicator may show the relative position of the image acquisition device 106 to the determined path 118. In this embodiment, the indicator may be a line (such as a different color than the path 118) that overlays or is adjacent to the path 118 displayed on the user interface 110.

Figure 8:
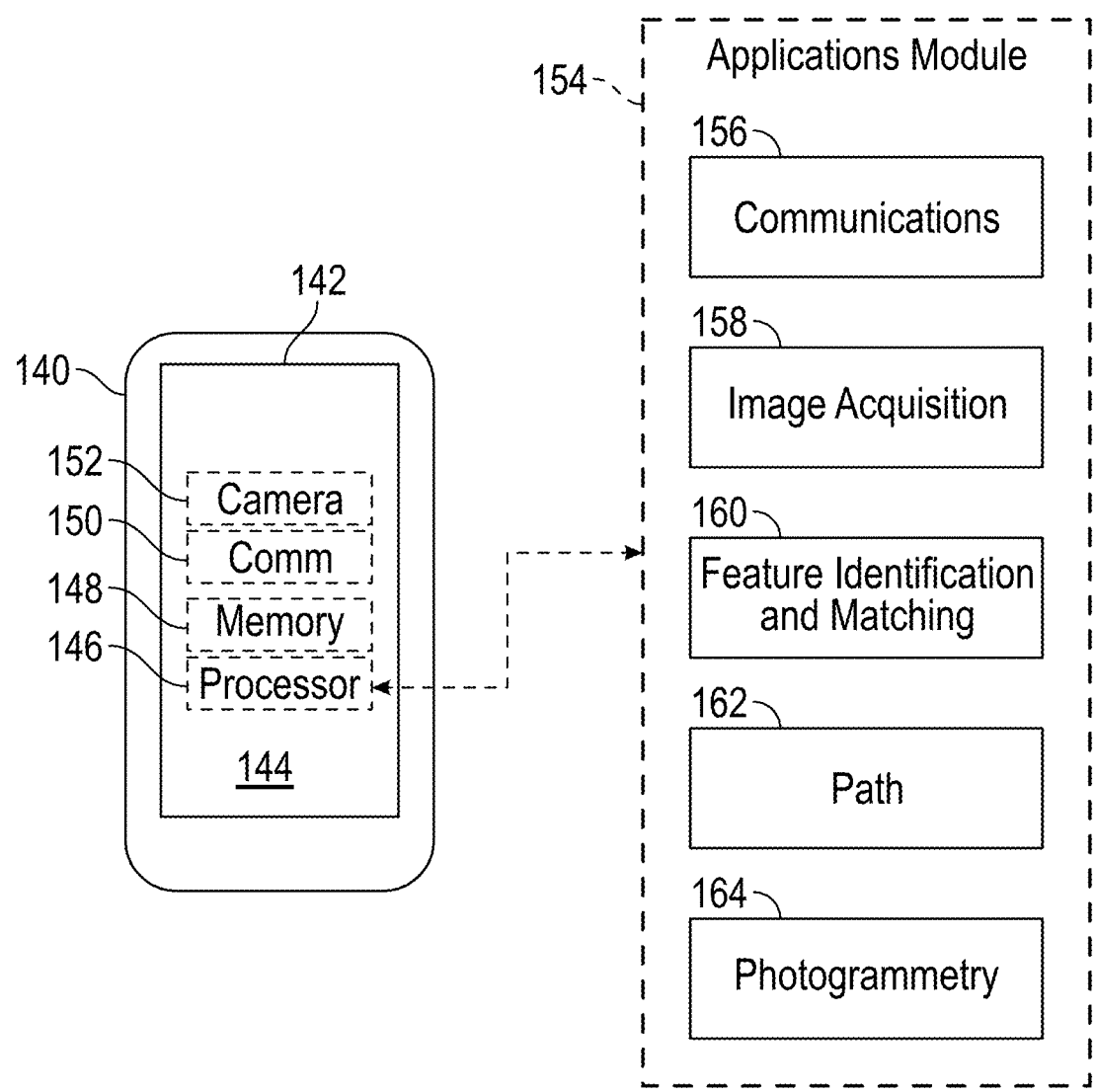
FIG. 8 is a schematic illustration of the mobile image acquisition device of FIG. 7 according to an embodiment.

Referring now to FIG. 8, an embodiment is shown of the image acquisition device, such as a cellular phone 140. The image acquisition device 140 may also be a smart pad, laptop computer, or other type of device having a processor, memory and a camera as described herein. In the exemplary embodiment, the cellular phone 140 includes a display 142 that presents a graphical user interface (GUI) 144 to the user. In one embodiment, the GUI 144 allows the user to view data, such as measured coordinate data for example, and interact with the cellular phone 140. In one embodiment, the display 142 is a touch screen device that allows the user to input information and control the operation of the cellular phone 140 using their fingers (e.g. to draw the outline 114 about the object). The cellular phone 140 further includes a processor 146 that is responsive to nontransitory executable computer instructions and to perform functions or control methods, such as those illustrated in FIGS. 1 and 6 for example. The cellular phone 140 may further include memory 148, such as random access memory (RAM) or read-only memory (ROM) for example, for storing application code that is executed on the processor 146 and storing data, such as coordinate data for example. The cellular phone 140 further includes communications circuits 150, such as near field communications (ISO 14443) circuit, Bluetooth (IEEE 802.15.1 or its successors) circuit and WiFi (IEEE 802.11) circuit for example. The communications circuits 150 are transceivers, meaning each is capable of transmitting and receiving signals. It should be appreciated that the cellular phone 140 may include additional components and circuits, such as a cellular communications circuit, as is known in the art.

The cellular phone 140 further includes at least one camera 152 that is configured to selectively acquire images in response to an input from the operator. In an embodiment, the camera 152 may include multiple lens, such as a standard lens and a zoom lens that may be selected by the operator. In an embodiment, the camera 152 may include a fisheye lens. In an embodiment, the camera may have a field of view between 60°-180°. In an embodiment, the field of view is less than 90°. In an embodiment, the field of view is about 130°.

The cellular phone 140 may further include additional modules or engines 154, which may be in the form of application software or "apps" that execute on processor 146 and may be stored in memory 148. These apps may include a communications module 156 that establishes communications with external devices, such as by using a Bluetooth circuit or WiFi circuit for example. The modules 620 may also include an image acquisition module 158, which allow the operator selectively acquire an image, to select the resolution of the image to be acquired and whether to acquire a single image, or a plurality of sequential images (e.g. a video).

The module 154 may further include a feature identification and matching module 160. The feature identification and matching module 160 receives 2D photogrammetry images from the image acquisition module 158 and executes feature detection methods, such as SIFT, SURF or BRIEF for example, to identify features in the image. The feature identification and matching module 160 further includes operational methods to match features from earlier images with current images.

The module 154 may further include a path or trajectory module 162. The path module 162 receives the images from module 158 and features from module 160 and determines a path from the current position and pose to a next position and pose where a 2D photogrammetry image will be acquired. In an embodiment, the path module 162 communicates with the GUI 144 to display an indicator, such as arrows 134, 136.

The module 154 may still further include a photogrammetry module 164. The photogrammetry module 164 receives photogrammetry images from module 158, the identified features from module 160, and the position and pose date from path module 162 and uses this information to determine 3D coordinates of one or more points on the surface of the object being measured using triangulation or photogrammetry techniques as is known in the art.

It should be appreciated that while embodiments herein illustrate the image acquisition device as being a handheld device, this is for exemplary embodiments and the claims should not be so limited. In other embodiments, the image acquisition device may be mounted on, or integrated into, an autonomous or semi-autonomous vehicle such as a mobile robot or a unmanned aerial vehicle (e.g. a drone). In this embodiment, the path is transmitted to the autonomous vehicle which moves to the desired locations to acquire the 2D photogrammetry images. In an embodiment, the 2D photogrammetry images are processed during the acquisition process. As discussed herein, this allows for the generation of a sparse point cloud (e.g. a collection of 3D coordinates of the object). This sparse point cloud may be used to change the flight route to more efficiently acquire images. As 2D photogrammetry images are acquired and the sparse point cloud is generated. This 3D coordinate data may be fed back to a flight control algorithm, which in turn could change the route according to the actual 3D information.

In an embodiment, the camera 152 includes a processing unit that incorporates artificial intelligence or machine learning capabilities. In an embodiment, the machine learning system has been trained to identify locations for acquiring images in a photogrammetry system that is determining three-dimensional coordinates. In an embodiment, the camera includes a model Myriad X or Myriad 2 video processing unit (VPU) manufactured by Movidius a division of Intel Corporation. The use of this VPU allows the camera to interpret video content and compare images directly rather than identifying and matching features. In this embodiment, the camera 152 tracks the position and pose by comparing images based on its content and the feature identification and matching may be eliminated. In another embodiment, the planning of the path may be performed by taking an over view image (similar to method 102) and the artificial intelligence module of the camera 152 develops a sequence of images to be acquired and a path. The path may be displayed on the user interface for the operator to manually move the image acquisition device, or may be transmitted to the autonomous vehicle. In an embodiment, the VPU is configured to automatically acquire the photogrammetry image when the image acquisition device is in the desired position and pose.

Figure 9:
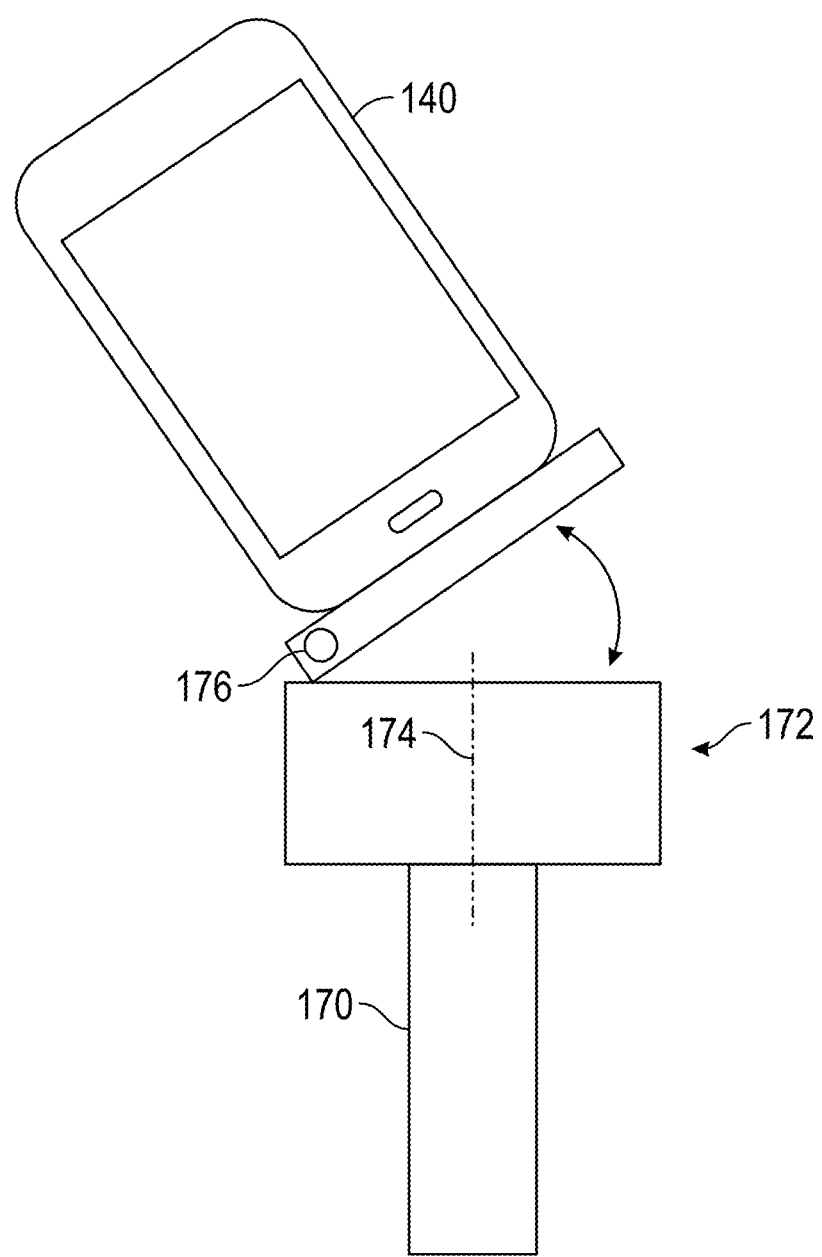
FIG. 9 is an elevation view of a device for automatically rotating the mobile acquisition device of FIG. 7 about a roll axis.

Referring now to FIG. 9, in an embodiment the image acquisition device 140 may be coupled to a fixture, such as a tripod 170 for example. The tripod 170 includes a head 172 upon which the image acquisition device 140 is mounted. The head 172 is rotatable about a first axis 174 to allow the changing of the pan orientation and about a second axis 176 to change the roll orientation of the image acquisition device 140. The rotation of the image acquisition device 140 about the pan and roll axis's may be performed manually, or automated via a signal from the image acquisition device 140 to one or more actuators (e.g. motors, not shown).

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A photogrammetry system comprising:
    a two-dimensional (2D) camera operable to acquire a 2D image at a first resolution and a second resolution, the first resolution being higher than the second resolution, the 2D camera further being operable to acquire a 2D video image at the second resolution;
    a user interface having a display; and
    a controller having a processor that is responsive to nontransitory executable computer instructions to perform a method comprising:
        acquiring a first 2D image of an object with the 2D camera at the first resolution;
        detecting at least one feature on the object in the first 2D image;
        determining an image sequence, the image sequence including a second position;
        acquiring with a plurality of second 2D images with the 2D camera at the second resolution;
        tracking, as the 2D camera is moved, the position and pose of the 2D camera based at least in part on the plurality of second 2D images;
        indicating on the display a direction of movement from a first position to a second position;
        acquiring a third 2D image of the object when the 2D camera reaches the second position; and
        determining three-dimensional (3D) coordinates of one or more points on the object based at least in part on the first 2D image and the third 2D image.

2. The system of claim 1, wherein the indicating of the direction of movement further includes indicating a change in pose of the 2D camera.

3. The system of claim 2, wherein:
    the image sequence includes a third position; and
    the method further comprises:
        indicating on the display a direction of movement from the second position to the third position;
        acquiring a fourth 2D image of the object when the 2D camera reaches the third position; and
        determining three-dimensional (3D) coordinates of one or more points on the object based at least in part on at least two of the first 2D image, the third 2D image, and the fourth 2D image.

4. The system of claim 1, further comprising a scale bar positioned adjacent the object, the first position and the second position being based at least in part on the position of the scale bar.

5. The system of claim 1, wherein the method further comprises determining a first path the 2D camera moved along the image sequence based at least in part on the plurality of second 2D images and the at least one feature.

6. The system of claim 5, wherein the indicating is based at least in part on an amount of overlap and the first path.

7. The system of claim 6, wherein the amount of overlap is greater than or equal to 80% of the first 2D image.

8. The system of claim 7, further comprising displaying on the display an indicator when in the second position.

9. The system of claim 8, wherein the method further comprises displaying the first path on the display.

10. The system of claim 1, further comprising an unmanned aerial vehicle, the 2D camera being mounted on the unmanned aerial vehicle.

11. The system of claim 1, further comprising a fixture, the fixture being user configurable to rotate about a roll axis, a pan axis and a tilt axis, the 2D camera being mounted to the fixture to rotate about the roll axis, the pan axis and the tilt axis.

12. The system of claim 2, wherein the indicating of the change in pose includes an amount of rotation about the roll axis.

13. The system of claim 1, wherein the 2D camera is mounted to an autonomous vehicle.

14. The system of claim 13, wherein the autonomous vehicle is an unmanned aerial vehicle.

15. The system of claim 1, the display is a mobile phone or mobile computer.

16. The system of claim 1, wherein the camera includes fisheye type lens.

17. The system of claim 1, wherein the camera has a field of view between 60°-180°.

18. The system of claim 17, wherein the field of view is less than 90°.

19. The system of claim 17, wherein the field of view is about 130°.

* * * * *